United States Patent [19]
Steiner

[11] 3,855,878
[45] Dec. 24, 1974

[54] TRANSMISSION SYSTEMS
[75] Inventor: Hubert Steiner, Longton, England
[73] Assignee: H. Steiner Limited, Staffordshire, England
[22] Filed: Mar. 16, 1973
[21] Appl. No.: 342,225

[30] Foreign Application Priority Data
Mar. 24, 1972   Great Britain.................. 14022/72

[52] U.S. Cl. ........................ 74/665 Q, 74/665 L
[51] Int. Cl. ........................................... F16h 37/06
[58] Field of Search.......... 74/665 L, 665 N, 665 P, 74/665 Q, 665 GA

[56] References Cited
UNITED STATES PATENTS
1,671,475   5/1928   Keim............................... 74/665 Q
2,107,072   2/1938   Herrington....................... 74/665 GA
2,835,143   5/1958   Kelbel.............................. 74/665 Q
3,083,790   4/1963   McAffee et al.................. 74/665 GA
3,487,721   6/1968   Burkhardt et al................. 74/665 N Primary Examiner—Samuel Scott
Assistant Examiner—P. S. Lall
Attorney, Agent, or Firm—Alan H. Levine

[57] ABSTRACT

A gearbox or transfer box having first and second input shafts and first and second output shafts, intermeshing gears mounted on the respective shafts, and control means operable to effect simultaneous movement of selected gears to change from a mechanical to a hydraulic output drive, the arrangement being such that both drives cannot be simultaneously connected to the output.

10 Claims, 3 Drawing Figures

TRANSMISSION SYSTEMS

The invention relates generally to power transmission systems.

The invention is especially, but not exclusively, applicable to power transmission systems providing a choice of mechanical or hydraulic drive to a common output and which may also include a facility for one or more auxiliary outputs.

One situation in which the invention is applicable is in relation to motor vehicles having road wheels selectively drivingly connectable to a mechanical drive from an engine through a change-speed gearbox, or a hydraulic drive from a motor driven by fluid supplied by an engine-driven pump. such vehicles often include in addition a power-take-off drive adapted to be driven from the engine.

The invention is concerned with the problem of preventing damage to the transmission system through simultaneously connecting both forms of drive to the output. Various arrangements for this purpose have been proposed, but have not hitherto been completely foolproof against a careless or thoughtless operator.

The invention provides a gearbox or transfer box having first and second input shafts and first and second output shafts, intermeshing gears mounted on the respective shafts, and control means movable to a first position to simultaneously:

a. connect said first input shaft to said first output shaft,
b. disconnect said first input shaft from said second output shaft,
c. disconnect said second input shaft from said first output shaft, and to a second position to simultaneously:-
d. connect said first input shaft to said second output shaft,
e. connect said second input shaft to said first output shaft,
f. disconnect said first input shaft from said first output shaft.

The invention also provides a power transmission system including an engine, a hydraulic motor, and a gearbox or transfer box in accordance with the preceding paragraph, in which said first input shaft is drivingly connected to said engine through a change-speed gearbox, and said second input shaft is drivingly connected to said hydraulic motor.

In use, when said control means is in said first position, said first input shaft is coupled to said first output shaft and a direct drive is provided through the transfer box from the engine, both the other shafts being isolated. On movement of said control means to said second position the direct drive is disengaged and the first output shaft is coupled through the second input shaft to the hydraulic motor, while the engine-driven input shaft is coupled to the second output shaft. The latter may advantageously drive a pump supplying hydraulic fluid to the hydraulic motor, or could provide an auxiliary output.

By virtue of such an arrangement it is impossible to connect both drives to the first output shaft and hence damage to the transmission through careless operation is avoided.

One advantageous use of the system is in relation to road vehicles such as lorries having a driver's cab and fitted with excavating and loading equipment mounted behind the cab and controlled by the driver of the vehicle from an operating station behind the cab, as described in British Pat. No. 1,109,803. A transmission system of the kind referred to may be incorporated to give the alternative of direct drive of the road wheels from the engine and gearbox in the usual way, or hydraulic drive for slow creeping speeds. A transfer box constructed in the manner referred to above, enables changeover from one form of drive to the other to be readily effected without danger of damage to the transmission. The hydraulic drive may advantageously be arranged to be controlled from the operating station so that the driver is not required to dismount from the lorry and enter the cab to effect forward or reverse movement of the lorry during use of the excavating equipment.

Embodiments of the invention will now be described, by way of example only, with reference to the accompanying drawings, in which.

Figure 1:
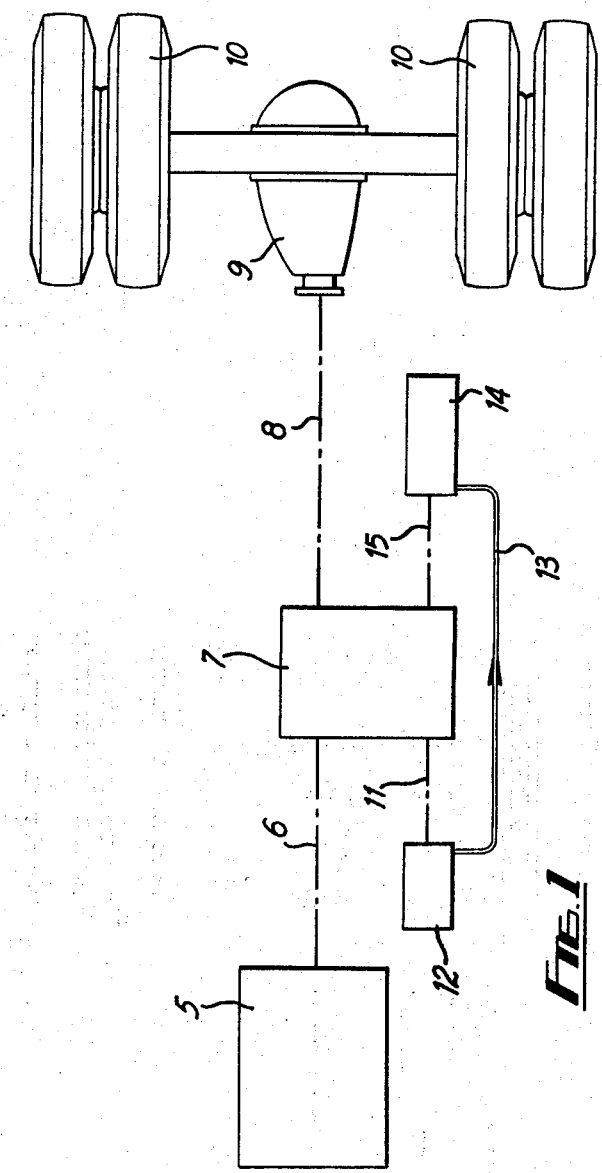
FIG. 1 is a schematic diagram of a vehicle transmission system.

Referring to FIG. 1, there is shown a vehicle transmission system comprising an engine 5 drivingly connected through a change-speed gearbox (not shown) and a propellor shaft 6 to a first input shaft of a gearbox or transfer box 7. The gearbox has a first output shaft connected through a propellor shaft 8 to a rear axle assembly 9 of the vehicle, and hence to the road wheels 10. The gearbox also incorporates a second output shaft connected through a propellor shaft 11 to a hydraulic pump 12 connected by a fluid supply line 13 to a hydraulic motor 14. The motor is drivingly connected through a propellor shaft 15 to a second input shaft of the gearbox 7.

A control mechanism (not shown) is provided by means of which the gearing within the gearbox may be placed into two alternative operative conditions. In the first condition the propellor shafts 6 and 8 are directly coupled to one another to provide a direct drive from the engine 5 to the road wheels 10, the shafts of the gearbox connected to propellor shafts 11 and 15 being isolated. In the alternative condition the propellor shafts 6 and 11 are connected together so that the engine drives the pump 12 and the latter supplies hydraulic fluid through line 13 to the motor 14. The propellor shafts 15 and 8 are also coupled together through the gearbox, and the road wheels 10 are thus driven from the hydraulic motor. The motor is preferably of the reversible, variable output, type to provide an infinitely variable low speed drive in a forward or reverse direction.

Figure 2:
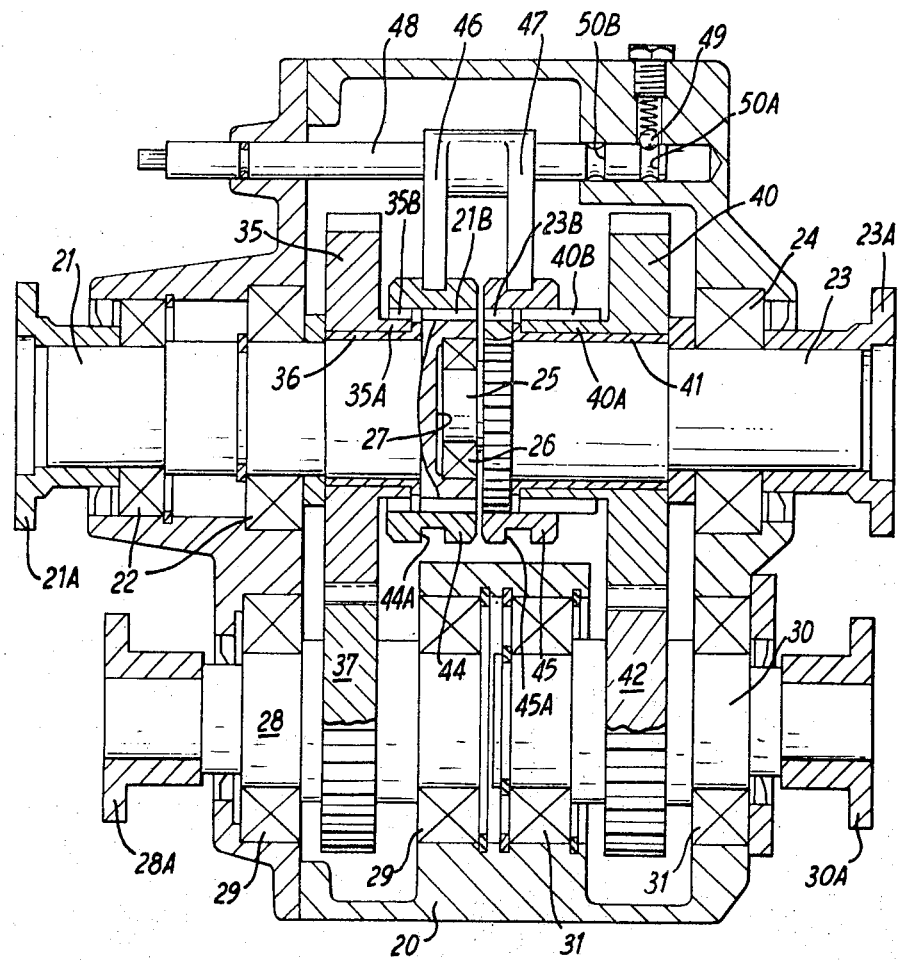
FIG. 2 is a transverse cross-section through one form of transfer box according to the invention suitable for use in the transmission system of FIG. 1.

FIG. 2 shows one form of gearbox by means of which the necessary drive connections can be established.

The box includes a casing 20, a main input shaft 21, supported in spaced bearings 22 in the casing 20, and co-axial with a main output shaft 23 supported at one end in bearings 24 in the casing and having a reduced diameter portion 25 at its other end supported in bearings 26 in a recess 27 formed in the inner end of the main input shaft 21. An auxiliary output shaft 28 is supported in a position parallel to and beneath the shaft 21 in spaced bearings 29, and an auxiliary input shaft 30 is supported in spaced bearings 31 in a position parallel to and beneath the main output shaft 23. The outer ends of these four parallel subshafts all project from the casing and are provided with respective coupling flanges 21A, 23A, 28A and 30A for connection to the propellor shafts shown in FIG. 1.

A gearwheel 35 is rotatably mounted on a bearing sleeve 36 on the main input shaft 21 and is in constant mesh with a gearwheel 37 non-rotatably secured to the auxiliary output shaft 28. A gearwheel 40 is rotatably supported on a bearing sleeve 41 on the main output shaft 23 and is in constant mesh with a gearwheel 42 non-rotatably mounted on the auxiliary input shaft 30. The inner end regions of the main input shaft 21 and main output shaft 23 are of greater diameter than the remainder of these shafts and are provided with external splines 21B and 23B aligned with similar splines 35B and 40B formed on hubs or sleeves 35A and 40A integral with the respective gears 35 and 40. Internally splined collars 44 and 45 are mounted on the ends of the respective shafts 21 and 23 and are provided with circumferential tracks 44A and 45A engaged by forks 46 and 47 forming part of a control member of shift mechanism including a rod 48 coupled by means (not shown) to a gear shift lever at a location convenient to the driver of the vehicle. The rod 48 may be moved to the right in FIG. 2 from the position illustrated, being retained in its alternative positions by engagement of a detent 49 in alternative grooves 50A and 50B formed adjacent the free end of the rod.

With the control rod 48 in the position shown, the collar 44 engages the splines 21B on shaft 21 and the splines 35B on sleeve 35A of gear 35, thereby connecting the latter to the main input shaft 21. At the same time the collar 45 engages the splines 23B of shaft 23 and the splines 40B of the sleeve 40A connected to gear 40, thereby connecting the latter to the main output shaft 23. In this position drive from the main input shaft 21 is transmitted through the gears 35 and 37 to the auxiliary output shaft 28. The latter drives the pump 12 (FIG. 1) thereby supplying hydraulic fluid to the motor 14 and driving the propellor shaft 15 which is coupled to the auxiliary input shaft 30 (FIG. 2). Drive from shaft 30 is transmitted through the gears 42 and 40 to the main output shaft 23. Thus the road wheels of the vehicle are driven from the hydraulic motor 14 which enables very low and infinitely variable "creep" speeds to be attained.

When the control shaft 48 is moved to the right in FIG. 2 the collar 45 moves clear of the splines 23B thereby disconnecting gearwheel 40 from the main output shaft 23. At the same time collar 44 becomes disengaged from the splines 35B and inter-connects the splined end regions 21B and 23B of the shafts 21 and 23. Gearwheel 35 is thereby disconnected from the main input shaft 21 and the latter is directly drivingly connected to the main output shaft 23. In this condition drive from the input shaft 21 is transmitted directly to the output shaft 23 and the auxiliary output and input shafts 28 and 30 are isolated. Normal drive of the road wheels of the vehicle may thereby be effected from the vehicle engine through the change-speed gearbox.

Figure 3:
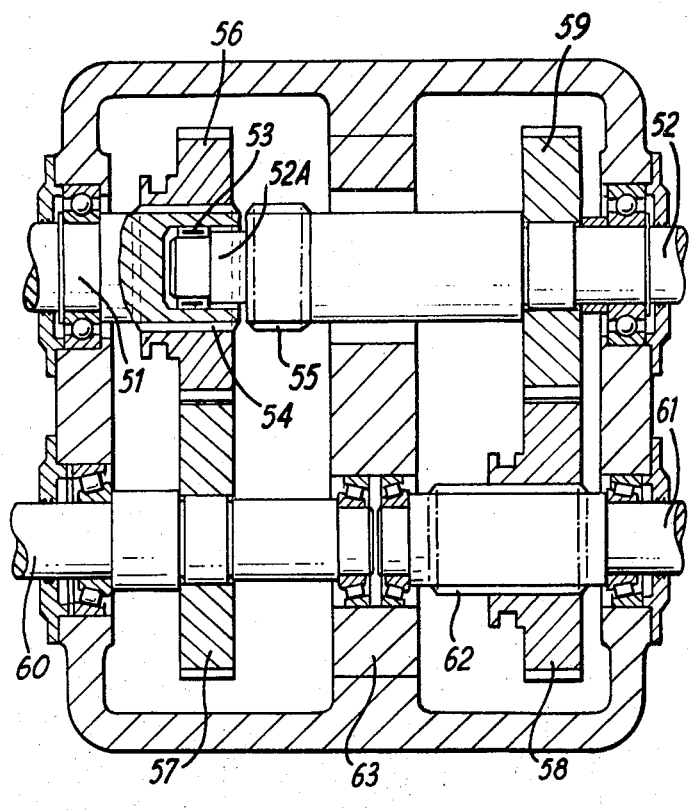
FIG. 3 is a view similar to FIG. 2 showing a modified form of transfer box.

FIG. 3 shows an alternative form of gearbox including a main input shaft 51, a main output shaft 52, an auxiliary input shaft 61 and an auxiliary output or power take-off (PTO) shaft 60. The shafts 60 and 61 are supported in bearings in the end walls of the box and in an internal partition 63. The shafts 51 and 52 are supported at their outer ends in bearings in the end walls of the box, and the shaft 52 extends through the partition 63 and has a reduced diameter end portion 52A supported on needle bearings 53 in a recess formed in the inner end of the shaft 51.

The adjacent portions of the shafts 51 and 52 are of the same diameter and provided with external splines 54, 55. A gear 56 is mounted on the splines of shaft 51 and may be moved by a control member of gear-shift lever (not shown) to the right in FIG. 3 so as to engage the splines of shafts 51 and 52 simultaneously and thereby form a driving connection between them.

When in the position illustrated, gear 56 meshes with a gear 57 mounted on shaft 60. When moved to its right-hand position connecting shafts 51 and 52, gear 56 is moved out of mesh with gear 57.

A gear 58 is slidably mounted on splines 62 on the auxiliary input shaft 61 and may be moved into and out of mesh with a gear 59 on the shaft 52. Movement of gear 58 is effected by the shift lever which acts on gear 56 so that both gears are moved simultaneously in opposite directions.

Thus, when used in the transmission system of FIG. 1, with the gear 56 in its left-hand position and gear 58 in its right-hand position, drive from the engine is transmitted through shaft 51, gear 56 and gear 57 to the shaft 60 which drives the pump and supplies fluid to the hydraulic motor. Drive from the hydraulic motor is transmitted through shaft 61, gear 58 and gear 59 to the shaft 52, the drive axle and the road wheels of the vehicle. This provides the facility for infinitely variable low speed drive of the vehicle.

By operation of the control means, gear 56 is moved to the right and gear 58 to the left. This connects shafts 51 and 52 and moves gears 56 and 57 and gears 58 and 59 out of mesh. Thus direct drive from the engine and change-speed gearbox to the road wheels can take place.

As previously indicated one use of the transfer box is in association with a vehicle-mounted excavating and loading attachment of the kind described in British Pat. No. 1,109,803. This comprises a lorry having a cab behind which is mounted a laterally-extensible jib structure having a stabilising foot engageable with the ground in the extended position. The jib structure is mounted on the chassis of the vehicle directly behind the driver's cab and carries an excavator bucket or other tool to enable digging, trenching or other operations to be carried out. Control of the jib structure is effected by the driver of the vehicle from an operating station behind the cab.

It is often desirable to move the vehicle forwards or backwards during use of the attachment, and by the provision of a transfer box of the kind described having a control for the hydraulic motor located at the operating station, the driver can operate the jib structure and move the vehicle backwards or forwards without entering the cab. Means of steering the vehicle from the operating station may also be incorporated. When the operation is completed, the driver can return to the cab and revert to normal mechanical drive by movement of the gear shift lever acting on the transfer box.

It will be appreciated that since the hydraulic drive is automatically disengaged when direct drive is engaged, and vice-versa, damage to the gearbox, transfer box or transmission cannot be effected due to careless operation. The transfer box is also of very compact and relatively simple construction.

Various modifications may be made without departing from the invention. For example in a four-wheel-drive vehicle a further output shaft may be geared to the main output shaft and connected to the front drive axle of the vehicle. When the hydraulic low speed drive is operative auxiliary equipment may be operated at the same time via a take-off from the auxiliary output shaft. Alternatively either the auxiliary equipment or the pump could be independently driven. To enable auxiliary equipment to be utilised without driving the vehicle a further control lever may be provided to enable disengagement of drive between the auxiliary input shaft and the main output shaft without disengaging the drive from the main input shaft to the auxiliary output shaft. An integral reduction gear could be provided on the auxiliary input shaft and additional output drives may also be provided. Transfer boxes according to the invention may be used in many situations other than those specifically referred to, one example being road planing machines where a very low speed drive is required during operations on the road while a normal high speed drive is required to transport the machine from one operating location to another.

I claim:
1. A gearbox comprising:
   a. a housing
   b. four shafts rotatably supported by said housing, said shafts including a main input shaft, a main output shaft, an auxiliary input shaft, and an auxiliary output shaft,
   c. a single control means movable between two operative positions, and
   d. means responsive to movement of said control means into one of its operative positions for simultaneously:
      I. connecting said main input shaft to said main output shaft,
      II. disconnecting said main input shaft from said auxiliary output shaft, and
      III. disconnecting said auxiliary input shaft from said main output shaft, and responsive to movement of said control means into the other of its operative positions for simultaneously:

I. connecting said main input shaft to said auxiliary output shaft,
   II. connecting said auxiliary input shaft to said main output shaft, and
   III. disconnecting said main input shaft from said main output shaft.

2. A gearbox according to claim 1 wherein said shafts are stub shafts, said main input shaft and said main output shaft being co-axial and provided with splines enabling them to be directly coupled to each another.

3. A gearbox according to claim 2 wherein one of said co-axial stub shafts is supported on bearings on a reduced-diameter end portion of the associated co-axial stub shaft.

4. A gearbox according to claim 3 wherein said shafts are arranged in two co-axial pairs.

5. A gearbox according to claim 4 wherein all said shafts are parallel to one another.

6. A gearbox according to claim 2 including gears freely rotatable on said co-axial stub shafts, and wherein said responsive means (d) includes splined collars movable to simultaneously couple said gears to their respective coaxial stub shafts or to disengage said gears from their respective coaxial stub shafts, one of said collars engaging both of said coaxial stub shafts to connect the shafts together when said collars are moved to disengage said gears from their respective coaxial stub shafts, and gears on the remaining two stub shafts in constant mesh with said gears on said two coaxial stub shafts, respectively.

7. A gearbox according to claim 2 including a gear on each of said shafts, each gear being non-rotatable with respect to its respective shaft, the gears on said main input shaft and auxiliary output shaft being intermeshed and the gears on said auxiliary input shaft and main output shaft being intermeshed when said control means is in said other of its positions, and wherein said responsive means (d) moves one of each of said pairs of intermeshing gears along its shaft and out of meshing engagement with its respective gear in response to movement of said control means to said one of its positions.

8. A gearbox according to claim 1 including further control means operable when said control means is in said other of its positions to disconnect said main output shaft and said auxiliary input shaft without disengaging said main input shaft to said auxiliary output shaft.

9. A gearbox or transfer box having a first input shaft, a first output shaft co-axial with the first input shaft, a gear mounted on each said shaft, splines provided on each said shaft, a second output shaft, a gear mounted on said second output shaft and in constant mesh with said gear mounted on said first input shaft, a second input shaft, a gear mounted on said second input shaft and in constant mesh with said gear mounted on said first output shaft, one of each pair of intermeshing gears being rotatably mounted on its shaft, splined collars associated with the splines on said first input shaft and first output shaft and with each of said rotatably mounted gears, said collars being interconnected by control means for movement between a first position in which:
   a. said first input shaft is connected to said first output shaft,
   b. said second input shaft is not connected to said first output shaft; and a second position in which:
   c. said first input shaft is connected to said second output shaft,
   d. said first input shaft is not connected to said first output shaft.

10. A gearbox or transfer box having a first input shaft, a first output shaft co-axial with the first input shaft, a gear rotatably mounted on each said shaft, splines provided on each said shaft, a second output shaft, a gear non-rotatably mounted on said second output shaft and in constant mesh with said gear mounted on said firt input shaft, a second input shaft, a gear non-rotatably mounted on said second input shaft and in constant mesh with said gear mounted on said first output shaft, a pair of splined collars slidably mounted on the splines of said first input shaft and first output shaft, said collars being interconnected by control means for movement between a first position in which the splines on said first input shaft and said first output shaft are drivingly interconnected and the gears on the respective shafts are freely rotatable thereon and a second position in which said gears are non-rotatably coupled to their respective shafts for rotation therewith and the splines of said shafts are no longer drivingly interconnected.

* * * * *